(12) United States Patent
Kaneda et al.

(10) Patent No.: US 8,337,033 B2
(45) Date of Patent: Dec. 25, 2012

(54) WASHING COUNTER

(75) Inventors: Takeshi Kaneda, Fukuoka-ken (JP);
Masanobu Wano, Fukuoka-ken (JP);
Hiroshi Nagakawa, Fukuoka-ken (JP);
Shigeru Asoh, Fukuoka-ken (JP);
Chihiro Sugiyama, Fukuoka-ken (JP);
Mitsunori Koga, Fukuoka-ken (JP);
Masaaki Ezawa, Fukuoka-ken (JP)

(73) Assignee: Toto Ltd, Fukuoka (JP)

( * ) Notice: Subject to any disclaimer, the term of this patent is extended or adjusted under 35 U.S.C. 154(b) by 145 days.

(21) Appl. No.: 12/992,917

(22) PCT Filed: May 15, 2009

(86) PCT No.: PCT/JP2009/059055
§ 371 (c)(1),
(2), (4) Date: Nov. 16, 2010

(87) PCT Pub. No.: WO2009/142153
PCT Pub. Date: Nov. 26, 2009

(65) Prior Publication Data
US 2011/0164418 A1  Jul. 7, 2011

(30) Foreign Application Priority Data

May 19, 2008 (JP) .................................. 2008-131382
Feb. 9, 2009 (JP) .................................. 2009-027878

(51) Int. Cl.
*E03C 1/18* (2006.01)
*F21V 8/00* (2006.01)
*F21V 33/00* (2006.01)

(52) U.S. Cl. ............... 362/96; 362/101; 362/582; 4/638
(58) Field of Classification Search .................. 362/127, 362/96, 101, 576, 582; 4/619, 654
See application file for complete search history.

(56) References Cited

U.S. PATENT DOCUMENTS 6,539,561 B2 * 4/2003 Shimizu ............................ 4/559
6,714,711 B1 * 3/2004 Lieberman et al. ........... 385/124
6,886,958 B1 * 5/2005 Grant ............................ 362/101

(Continued)

FOREIGN PATENT DOCUMENTS

DE  20 2006 003617 U1  6/2006

(Continued)

OTHER PUBLICATIONS

International Search Report for PCT/JP2009/059055 dated Jul. 14, 2009.

*Primary Examiner* — Peggy A. Neils
(74) *Attorney, Agent, or Firm* — Pearne & Gordon LLP (57) ABSTRACT

A washing counter, including a bowl portion having a concave configuration used for washing and the like, a counter portion supporting the bowl portion, and a light source portion disposed on a backside of the bowl portion to emit light toward the bowl portion. The light radiates from the surface of the bowl to the surroundings with at least one portion of the bowl portion being formed of a transparent member. The transparent member is obtained by dispersing a light diffusing member in a base member having a transparent raw material having light-transmitting transparency. The light diffusing member being a micro particle having a transparent raw material having a light refractive index different from a light refractive index of the base member.

6 Claims, 6 Drawing Sheets

U.S. PATENT DOCUMENTS

| | | | |
|---|---|---|---|
| 7,228,574 B2 * | 6/2007 | Hansen et al. | 4/619 |
| 7,377,661 B2 * | 5/2008 | Douglass | 362/101 |
| 7,434,960 B2 * | 10/2008 | Stuhlmacher et al. | 362/253 |

FOREIGN PATENT DOCUMENTS

| | | |
|---|---|---|
| JP | 63-317118 A | 12/1988 |
| JP | 02-6557 A | 1/1990 |
| JP | 02-139579 U | 11/1990 |
| JP | 2002-212448 A | 7/2002 |
| JP | 2005-103058 A | 4/2005 |
| JP | 2005-304873 A | 11/2005 |
| JP | 2005-342179 A | 12/2005 |
| JP | 2007-125194 A | 5/2007 |
| TW | 200635553 A | 10/2006 |

* cited by examiner

WASHING COUNTER

TECHNICAL FIELD

The invention relates to a washing counter in which a bowl portion emits light.

BACKGROUND ART

Much conventional technology exists to brighten a washstand by radiating light from a countertop or a bowl portion of a washing makeup stand having a bowl portion.

For example, beginning with basic technology in which a countertop included in a washing makeup stand is formed of a transparent material and a line-shaped light emission source is disposed on the countertop back face as disclosed in JP-A 63-317118 (Kokai) (1988), technology exists capable of irradiating light upward through a bowl portion included in a wash basin of a washing makeup stand by forming the bowl portion of a transparent material and disposing an illuminator of a line-shaped light emission source below the back face of the bowl portion as disclosed in JP-U 2-139579 (Jikkai) (1990). Further, technology has been disclosed to illuminate with different colors according to a discharge water temperature as disclosed in JP-A 2007-125194 (Kokai) by forming the washbowl of a transparent material, burying a light emission source made of blue LEDs and red LEDs directly in the washbowl, sensing the discharge water temperature, and illuminating via the washbowl with colors differing with the sensed temperature.

Each of these are light-emitting washstands having the light source disposed below the countertop or below the bowl portion or buried in the material of the bowl portion and in which the transmitted light from the countertop or the bowl portion formed of the light-transmitting transparent raw material was utilized.

Further, a washing counter is disclosed in JP-A 2005-304873 (Kokai) in which a counter portion supporting the bowl portion is provided; the counter portion is formed of a transparent raw material; and a light source is disposed in an end portion thereof. An opening is provided in the counter portion for placing the bowl portion; and light from the light source is guided to the interior of the counter portion and radiated to the surroundings from the circumferential edge of the opening recited above.

PRIOR ART DOCUMENTS

Patent Documents

Patent Document 1: JP-A 63-317118 (Kokai) (1988)
Patent Document 2: JP-U 2-139579 (Jikkai) (1990)
Patent Document 3: JP-A 2007-125194 (Kokai)
Patent Document 4: JP-A 2005-304873 (Kokai)

DISCLOSURE OF INVENTION

Problems to be Solved by the Invention

In the conventional washing makeup stand having a light emission source as recited above, the raw material forming the countertop and the bowl portion was formed of a transparent raw material due to the necessity to transmit the light from the light emission source because the light emission was performed with the transmitted light and the reflected light from the light emission source. On the other hand, because pipes and the like performing the supply and drainage of water, etc., are disposed below the washing makeup stand, from the aspect of external appearance quality, it is necessary to make such members visually unconfirmable from the user side. Conventionally as well, there were many cases where unevenness of the lighting occurred, excessive glare was produced, and matching to the illumination environment corresponding to the placement location of the light-emitting washstand was not provided even though the light emission source could not be directly viewed from the user side by making the transparent raw material surface in matt configurations, making the raw material itself semi-transparent, etc.; and many cases ended up providing merely the novelty of a washstand emitting light. An object of the invention is to improve the overall external appearance quality affected by the transparency of the raw materials used including the light emission quality in a washing makeup stand having a light emission source using a transparent raw material by the appropriate configuration of the transparent raw material and the light emission source.

Solution to the Problems

According to the invention, there is provided a washing counter characterized by: a bowl portion having a concave configuration used for washing and the like; a counter portion supporting the bowl portion; and a light source portion disposed on a backside of the bowl portion to emit light toward the bowl portion, where the washing counter radiates the light from the light source portion to surroundings from a surface of the bowl portion, at least one portion of the bowl portion is formed of a transparent member obtained by dispersing a light diffusing member in a base member having a transparent raw material having a light-transmitting transparency, the light diffusing member is a micro particle having a transparent raw material having a light refractive index different from a light refractive index of the base member, the light source portion is disposed to face an end face of a butt portion of the transparent member, and at least one portion of the transparent member is a light radiation portion where the light from the light source portion guided through the transparent member with the end face of the butt portion as an incident portion is radiated outside by the light radiation portion while being diffused by the light diffusing member due to the at least one portion of the bowl portion being formed of the transparent member and the light source portion being disposed to face the end face.

DESCRIPTION OF EMBODIMENTS

The invention is characterized by: a bowl portion having a concave configuration used for washing and the like; a counter portion supporting the bowl portion; and a light source portion disposed on a backside of the bowl portion to emit light toward the bowl portion, where the washing counter radiates the light from the light source portion to surroundings from a surface of the bowl portion, at least one portion of the bowl portion is formed of a transparent member obtained by dispersing a light diffusing member in a base member having a transparent raw material having a light-transmitting transparency, the light diffusing member is a micro particle having a transparent raw material having a light refractive index different from a light refractive index of the base member, the light source portion is disposed to face an end face of a butt portion of the transparent member, and at least one portion of the transparent member is a light radiation portion where the light from the light source portion guided through the transparent member with the end face of the butt portion as an incident portion is radiated outside by the light radiation portion while being diffused by the light diffusing member due to the at least one portion of the bowl portion being formed of the transparent member and the light source portion being disposed to face the end face.

According to such a configuration, the light radiation portion of the bowl portion can be caused to emit light over a wide range as if there were a light source therein, that is, self-illuminatively and uniformly, by the light radiation portion being formed of the transparent member in which the light diffusing member is dispersed in the transparent raw material and by the light from the light source entering from the butt portion of the transparent member being guided through the transparent member to the light radiation portion to be radiated uniformly at a naked-eye level while being diffused by the light diffusing member. As a result, it is possible to enhance only a designated section of the bowl portion with faint light excellent for design in a state in which unnecessary portions are shielded from the line of sight of a user; and the washing counter can have high designability matched to the illumination environment of the placement location of the washing counter.

Further, one mode of implementation of the invention is characterized in that, in the invention, the bowl portion includes a bowl main body member formed entirely of the transparent member and having a side wall portion having a protruding wall portion protruding upward from a top face of the counter portion and includes a light-shielding member formed of a light-shielding raw material shielding a transmission of light, where the light-shielding member is disposed to cover an inner face of the bowl portion at substantially the same height as the top face of the counter portion; the butt portion is a lower end portion of the side wall portion; and the light radiation portion is a surface of the protruding wall portion.

According to such a configuration, because the bowl main body is formed of a single-body raw material, in addition to the effects of the invention, not only are the manufacturing processes of the bowl main body simplified, but also the designability of the washing counter increases because the bowl inner face inward from the side wall portion is concealed by the light-shielding member and therefore the user visually confirms that only the entire circumferential side portion of the bowl portion, that is, the inner and outer surfaces and the upper end face of the side wall portion, are emitting light; and not only can a unique light radiation phenomenon of light be obtained, but also a blindfold effect of the drainage port and the like disposed in the bottom face portion of the bowl main body can be expected.

Further, one mode of implementation of the invention is characterized in that, in the invention, the bowl portion is formed as a single body of a bottom wall portion formed of a light-shielding raw material and a side wall portion formed of the transparent member; the butt portion is a lower end portion of the side wall portion; and the light radiation portion is a surface of the side wall portion.

According to such a configuration, because the bottom wall portion formed of the light-shielding raw material is formed as a single body with the side wall portion formed of the transparent member, in addition to the effects of the invention, an effect is provided of light being irradiated from the circumferential side to envelope the inside of the bowl portion to realize a subtle and profound light environment with a simple configuration by light not being emitted from the bottom wall portion of the light-shielding raw material and light being emitted only from the side wall portion even when light enters the side wall portion from directly therebelow and is guided to the bottom wall portion of the bowl portion formed as a single body.

Further, one mode of implementation of the invention is characterized in that, in the invention, the bowl portion has a drainage port portion formed of the transparent member and configured to discharge water from inside the bowl portion to outside the bowl portion; the butt portion is a lower end portion of the drainage port portion; and the light radiation portion is an inner surface proximal to the drainage port portion.

According to such a configuration, because the end portion of the butt portion of the drainage port portion, which is always placed in a normal bowl portion, is used as the light incident portion, in addition to the effects of the invention, it is possible to limit the design modifications of the washing counter that occur when providing light-emitting configuration to a minimum because the bowl portion can have a light-emitting configuration without greatly modifying the drainage structure of a normal bowl portion.

Further, one mode of implementation of the invention is characterized in that the bowl portion of the mode of implementations further includes a drainage metal fitting mounted on the drainage port portion and the light source portion is mounted on the drainage metal fitting.

According to such a configuration, because the light source portion is mounted to the drainage metal fitting member mounted to the drainage port portion, in addition to the effects of the mode of implementations, it is unnecessary to newly set a mounting location to sturdily mount the light source portion; and the ease of work also increases because the mounting work of the light source portion can be performed simultaneously with the mounting work of the drainage metal fitting member.

Further, one mode of implementation of the invention is characterized in that, in the invention, a surface of the bowl portion is a light scattering face made of a rough surface having a micro unevenness.

According to such a configuration, because the light is diffused by the light diffusing face, in addition to the effects of the invention, scratches and dirt on the surface of the bowl portion are not easily noticeable; and the designability can be increased further.

Further, one mode of implementation of the invention is characterized in that, in the invention, the light source portion is a line-shaped light source made of a plurality of LED devices arranged according to a configuration of the bowl portion.

According to such a configuration, because the light source portion can be disposed to match the configuration of the bowl portion, in addition to the effects of the invention, it is possible to efficiently utilize the light from the light source portion. Also, the frequency of the replacement work of the light source portion can be reduced as much as possible because the life of the LED light source is longer than those of other light sources.

Embodiments of the invention will now be described with reference to the drawings.

First Embodiment

Figure 1:
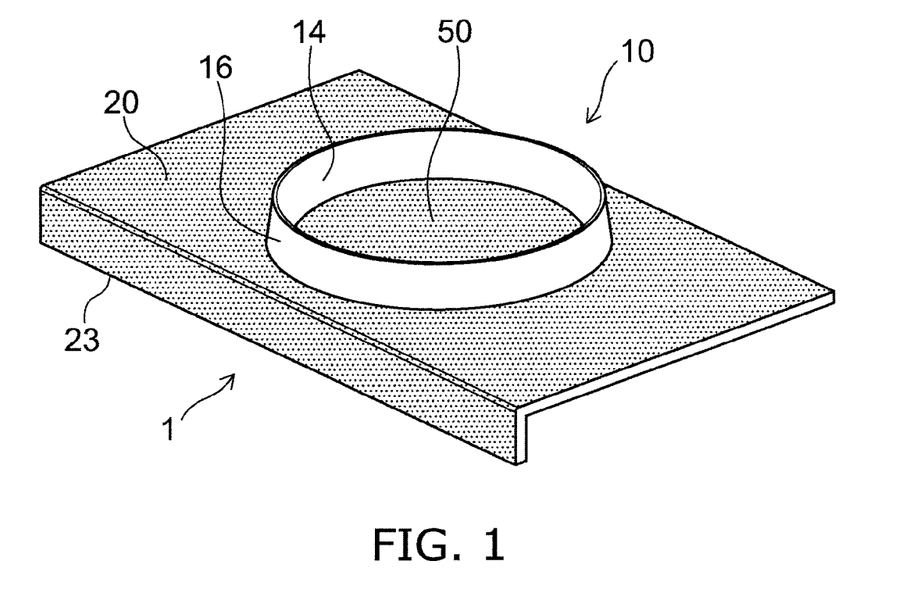
FIG. 1 is a perspective view illustrating the general view of a washing counter according to a first embodiment of the invention.
Figure 2:
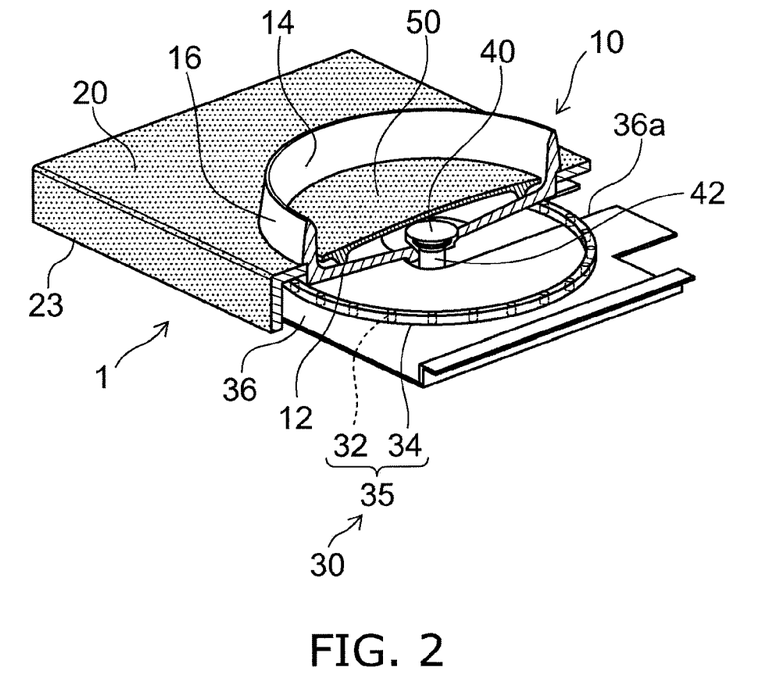
FIG. 2 is a perspective view in which a portion of the washing counter according to the first embodiment of the invention is cut away.

FIG. 1 is a perspective view illustrating the general view of a washing counter according to a first embodiment of the invention; FIG. 2 is a perspective view in which a portion of the washing counter according to the first embodiment of the invention is cut away; and FIG. 3 is a side cross-sectional view of the washing counter according to the first embodiment of the invention.

Figure 3:
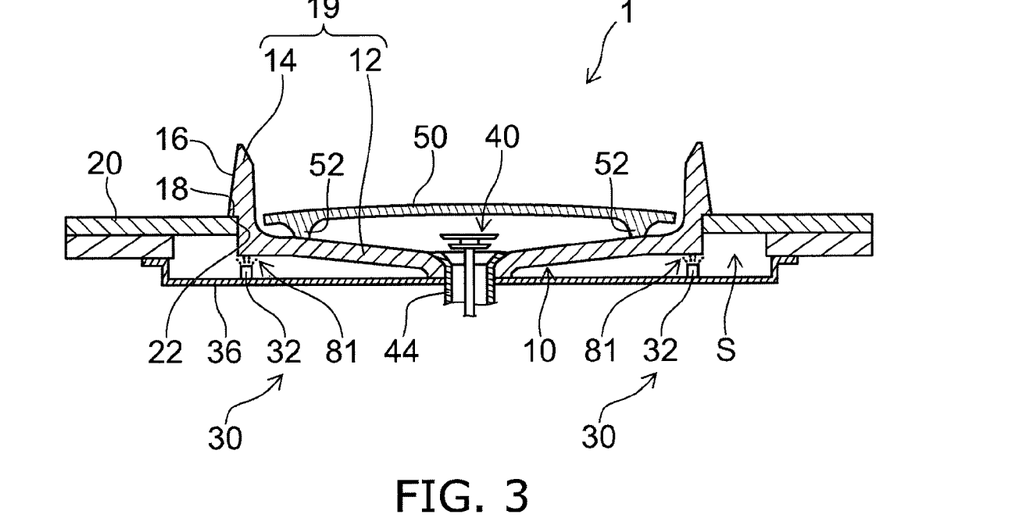
FIG. 3 is a side cross-sectional view of the washing counter according to the first embodiment of the invention.

The washing counter 1 according to this embodiment is placed, for example, in eating and drinking establishments such as restaurants and bars; and the washing counter 1 includes a bowl portion 10 having a concave configuration used for washing and the like, a counter portion 20 supporting the bowl portion 10, and a light source portion 30 disposed on the backside of the bowl portion 10 to emit light toward the bowl portion 10 as illustrated in FIG. 1 to FIG. 3.

The bowl portion 10 includes a light-shielding lid body (a light-shielding member) 50 and a bowl main body (a bowl main body member) 19 having a bottom wall portion 12 and a side wall portion 14, where the bottom wall portion 12 has a substantially discal configuration and is connected to a drainage pipe 42 via a central drainage metal fitting 40, the side wall portion 14 is substantially perpendicular and is formed continuously in the entire circumference of the bottom wall portion 12, and the light-shielding lid body 50 has a substantially discal configuration covering the entire bottom wall portion 12 and is used as the light-shielding member of the invention formed of the light-shielding raw material.

A rim-like portion 18 is provided partway through the outer circumferential edge of the side wall portion 14 of the bowl portion 10, where the rim-like portion 18 has a diameter greater than that of an opening 22 for placing the bowl main body 19 in the counter portion 20. The bowl main body 19 is supported by the counter portion 20 by the rim-like portion 18 in a state in which the bowl main body 19 fits into in the opening 22 of the counter portion 20 from above. Thereby, the portion of the side wall portion 14 protruding upward from the top face of the counter portion 20 forms a protruding wall portion 16.

In this embodiment, the entire bowl main body 19, i.e., the bottom wall portion 12 and the side wall portion 14, are formed of a transparent member in which a light diffusing member 60, which diffuses the incident light, is dispersed and contained in an epoxy resin, which is one example of a transparent raw material that transmits light. The light diffusing member 60 is formed of a micro particle having a transparent raw material having a light refractive index different from that of the base member of the bowl main body 19. Specifically, the light diffusing member 60 is formed of a polymethacrylic acid ester particle.

The counter portion 20 is formed of a light-shielding raw material that shields the transmission of light in a substantially flat plate configuration and has the opening 22 for placing the bowl portion 10 in substantially the center. The counter portion 20 shields the light from the light source portion 30 and prevents the light from the light source portion 30 from leaking upward in a state in which the bowl portion 10 is placed in the opening 22 and supported. Further, an apron portion 23 is provided in a front end portion of the counter portion 20 as a decorative plate extending downward from the top face.

A fixation plate 36 formed of a light-shielding raw material is mounted to the back face of the counter portion 20 via not-illustrated screws and the like. Further, multiple LED devices 32, which are the light source portion 30, are placed at prescribed spacing from each other and disposed in a circular ring configuration in the fixation plate 36 at a prescribed distance downward from the side wall portion 14 lower end of the bowl portion 10.

The fixation plate 36 has a configuration in which a cut-away portion 36a which is cut away is provided to avoid the drainage pipe 42; and the light source portion 30 with the fixation plate 36 can be attached and removed to and from the counter portion 20 even in the state in which the bowl portion 10 is set in the counter portion 20 and connected to the drainage pipe 42. Therefore, it is easy to make maintenance possible even in the unlikely case where a discrepancy occurs in the light source portion 30.

The light source portion 30 is a line-shaped light source in which the multiple LED devices 32 are arranged according to the configuration of the bowl portion 10. The light source portion 30 aligns the light emission direction of the LED devices 32 and provides orientation to the radiated luminous flux from the LED devices 32. The LED devices 32 are used as the light source portion 30 because the frequency of the replacement work of the light source portion 30 can be reduced as much as possible because the life of the LED device 32 is longer than those of other light sources.

In the light source portion 30, the multiple LED devices 32 are placed at prescribed spacing from each other and mounted to a flexible line-shaped band 34. Then, the light source portion 30 may be disposed according to the configuration of the bowl portion 10 by bending the line-shaped band 34 into a circular ring configuration along the outer circumferential edge of the bottom wall portion 12 having the discal configuration. In other words, in this embodiment, an annular LED portion 35 linked in an annular configuration along the outer circumferential edge of the bottom wall portion 12 having the discal configuration is used as the light source portion 30.

Moreover, the LED devices 32 of the light source portion 30 are disposed directly below the lower end portion of the side wall portion 14. In other words, the LED devices 32 of the light source portion 30 are disposed to face the end face formed in the lower end portion of the side wall portion 14 and rising substantially perpendicularly. Accordingly, the lower end portion (the butt portion) of the side wall portion 14 functions as a light incident portion 81 which is capable of having light incident thereon and can efficiently introduce the light from the light source portion 30 provided with the orientation in the radiation direction in large amounts to the side wall portion 14 interior.

Herein, "butt portion" of the invention refers to the section including the end face which is the thickness of a wide member such as the left and right end faces and the upper and lower end faces of a plate configuration, etc. Herein, the side wall portion 14 of this embodiment has a lower end portion which has a cylindrical plate configuration enclosing the entire bottom wall portion 12 with its thickness in the diametrical direction. Therefore, the lower end portion corresponds to the butt portion of the invention. Further, the side wall portion 14 is formed of a member corresponding to the transparent member of the invention. Accordingly, the light source portion 30 is disposed to face the end face of the butt portion of the transparent member included in the bowl portion 10.

In this embodiment as recited above, the state in which the light source portion 30 is mounted to the counter portion 20 is the state in which the multiple LED devices 32 are stored in a closed space S interposed between the counter portion 20 and the fixation plate 36 thereabove and therebelow and defined also by the bowl main body 19. As described above, the counter portion 20 and the fixation plate 36 are formed of light-shielding raw materials; and the bowl main body 19 is formed of a transparent raw material.

Accordingly, the light emitted from the LED devices 32 included in the light source portion 30 other than the light entering the bowl main body 19 interior is blocked by the counter portion 20 and the fixation plate 36, does not leak outside the space S, and efficiently enters the interior of the bowl main body 19 from the back face of the bowl main body 19, and more specifically, from the side wall portion 14 lower end of the bowl portion 10.

Although the bottom wall portion 12 of the bowl main body 19 also is formed of a transparent raw material, the greater part thereof is isolated from the light source portion 30 and is separated from the radiation direction of the light. Therefore, the light from the light source portion 30 does not easily reach the bottom wall portion 12 and is introduced to the bowl main body 19 interior mainly from the butt portion of the side wall portion 14, i.e., the lower end face (the lower end portion) of the side wall portion 14. Also, the light-shielding lid body 50 described above is disposed in the bottom wall portion 12 of the bowl main body 19 to cover the bottom wall portion 12 from above; and the light radiated upward from the surface of the bottom wall portion 12 is blocked by the light-shielding lid body 50.

Further, in this embodiment, by using a configuration such as that recited above, only the surface of the protruding wall portion 16 of the side wall portion 14 is used as a light radiation portion 82 (referring to FIG. 4) that radiates the light to the surroundings (out of the washing counter 1). The light radiation portion 82 is described below in detail.

As a result, compared to the case where light is radiated to the outside from the entire surface of the bowl portion 10 as seen in conventional examples, a peculiar beautiful appearance can be realized and the designability as a washing counter increases remarkably.

Moreover, the drainage metal fitting 40 provided in the center of the bottom wall portion 12 can be shielded from the line of sight of the user by thus disposing the light-shielding lid body 50 to cover the bottom wall portion 12.

Three leg portions 52 are provided on the lower face of the light-shielding lid body 50; and in this embodiment, the height of the top face of the light-shielding lid body 50 is substantially the same as the height of the top face of the counter portion 20 in the state in which the light-shielding lid body 50 is placed on the bottom wall portion 12 via the leg portions 52.

Further, the surface properties of the top face of the light-shielding lid body 50 including the pattern and the color is the same as the surface properties of the top face of the counter portion 20 including the pattern and the color to unify the raw material senses of the two experienced by the user.

In this embodiment, by using a configuration such as that recited above, an exceedingly peculiar design is realized in which the side wall portion 14 of the bowl portion 10, and more specifically, only the protruding wall portion 16 of the side wall portion 14 protrudes upward in a substantially ring configuration from the top face of the counter portion 20.

Further, in the case where the raw material sense of the upper face of the light-shielding lid body 50 and the top face of the counter portion 20 is different from the raw material sense of the bowl portion 10, the external appearance of the protruding wall portion 16 of the bowl portion 10 can be accentuated markedly with respect to the light-shielding lid body 50 and the counter portion 20; and the designability can be increased further.

The radiation principle of the light from the light radiation portion of the invention will now be described specifically with reference to a schematic view illustrating the radiation mode of the light of this embodiment.

Figure 4:
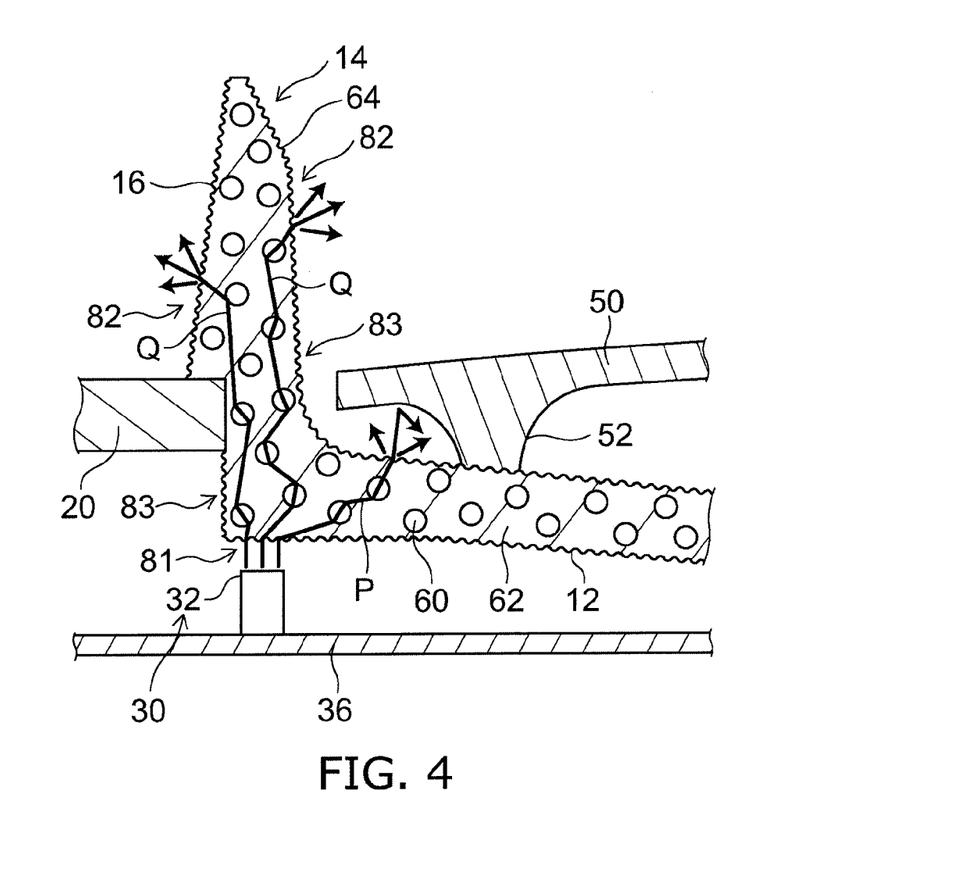
FIG. 4 is a descriptive view from a cross-sectional view illustrating a radiation mode of light from a bowl portion.

FIG. 4 is a descriptive view from a cross-sectional view of the side wall portion 14 proximity of the bowl portion 10 of this embodiment.

As illustrated in FIG. 4, the bowl main body 19 is formed of a transparent member in which the light diffusing member 60, which diffuses light, is dispersed and contained in a transparent base member 62, which is made of an epoxy resin which is a transparent raw material.

The light diffusing member 60 is a micro particle having a substantially spherical configuration formed of a transparent raw material having a refractive index different from that of the transparent raw material of the transparent base member 62. Here, it is possible to experimentally determine the refractive index difference of the two based on the target design quality.

Thus, by providing the refractive index difference between the light diffusing member 60 and the transparent base member 62 included in the transparent member, even though both are raw materials having light transmission characteristics that transmit light, the light incident on the transparent member exhibits different behavior such as reflection and refraction at the interface of the two, i.e., in the case of the invention, the interface between the transparent base member 62 and each of the light diffusing members 60, due to the incident angle.

Generally, because light travels in a straight line, it is necessary to diffuse (disperse) the incident light in the member interior toward the visual confirmation direction such that the light incident on the transparent member reaches directions other than the propagation direction such that it can be visually confirmed as if the section emits light. The diffusing in the interior of the transparent member can be realized also by dispersing and containing a non-transparent micro particle in the transparent raw material and reflecting and scattering the incident light by the micro particle surface. However, in such a case, each of the micro particles is different from those of the invention by being non-transparent; and therefore, each of the micro particles struck by the light shields the path of the light, and the attenuation rate of the light of the propagation direction increases. As a result, it was confirmed by our experiments as well that it is difficult to emit light uniformly to the naked eye to a relatively long distance from the light incident portion.

Conversely, in this embodiment, the light propagates through the transparent member, in which the light diffusing member 60 formed of a transparent raw material is dispersed and contained in the transparent base member 62, while being reflected and transmitted/refracted by the surface of the light diffusing member 60 forming the interface between the two according to the incident angle. In other words, a portion of the light reaches a region relatively distal to the incident portion as a result of passing through the interface with the light diffusing member 60 and propagating forward. Therefore, it is possible for the transparent member as an entirety to manifest a moderate and relatively uniform brightness over a relatively wide range.

Specifically, the light from the light source portion 30 entering the interior of the bowl main body 19 from the lower face of the side wall portion 14 of the bowl portion 10, i.e., the end face of the butt portion of the side wall portion 14 forming the cylindrical configuration portion, propagates through the bowl main body 19 and reaches the light diffusing members 60. Then, due to the refractive index difference at the interface between the light diffusing member 60 and the transparent base member 62, the light is reflected and refracted at the surface of the light diffusing member 60 according to the incident angle thereof. Thus, the light entering the interior of the bowl main body 19 propagates gradually through the bowl main body 19 while diffusing. Then, the light diffused in the bowl main body 19 interior that reaches the surface of the bowl main body 19 surface (the surfaces of the side wall portion 14 and the bottom wall portion 12) at an angle not less than the total internal reflection critical angle of the transparent base member 62 is radiated to the outside from the surface of the bowl main body 19.

At this time, the greater part of the light (the light Q) entering the interior of the bowl main body 19 from the light source portion 30 propagates toward the upper end portion of the side wall portion 14 because the light source portion 30 has an orientation in the radiation direction of the light as described above and is placed with the radiation direction oriented toward the side wall portion 14. Although radiated to the outside from the portions of the surface of the side wall portion 14, the portion of light radiated from the lower portion of the side wall portion 14 is blocked from propagating to the surroundings (out of the washing counter 1) by the light-shielding lid body 50. On the other hand, the portion of the light entering the interior of the bowl main body 19 propagates also in the direction of the bottom wall portion 12 which is formed of the same transparent member as the side wall portion 14. Although such light P propagating toward the direction of the bottom wall portion 12 is radiated to the outside from the surface of the bottom wall portion 12, the light P is blocked by the light-shielding lid body 50 and is not radiated upward from the light-shielding lid body 50.

That is, in this embodiment, the light entering the bowl main body 19 interior from the end face of the lower end portion (the butt portion) of the side wall portion 14 is guided through the bowl main body 19 while being diffused by the light diffusing member 60 and is radiated to the surroundings (out of the washing counter 1) only from the protruding wall portion 16. Restated, the light radiated from the light source portion 30 placed on the backside of the bowl main body 19 formed of the transparent member does not just simply pass through the bowl main body 19 in the plate thickness direction to reach the surface side but enters from the butt portion and is guided through the interior of the bowl main body 19 in a direction substantially orthogonal to the plate thickness direction, subsequently has its path bent progressively in the plate thickness direction by the light diffusing member 60, and is radiated to the surroundings (out of the washing counter 1) from the surface of the protruding wall portion 16 used as the light radiation portion 82.

Thus, in this embodiment, the lower end face of the side wall portion 14 corresponding to the end face of the butt portion of the invention is the light incident portion 81 where the light radiated from the light source portion 30 is incident; and of the surface of the bowl main body 19, the surface of the protruding wall portion 16 is used as the light radiation portion 82 of the invention that radiates the light to the surroundings. Then, the bowl main body 19 interior functions as a light guide portion 83 in which the incident light propagates to the light radiation portion 82.

As a result, an external appearance mode is provided as if the protruding wall portion 16 of the bowl portion 10 itself is spontaneously faintly radiating light. Therefore, it is possible to create a fantastic and unique atmosphere in which the existence of the bowl portion 10 which is a portion of the washing counter 1 is enhanced by light; and a washing counter 1 matched to the surrounding environment and having high designability can be provided. Herein, in the specification of the application, "being self-illuminative" or "emitting light self-illuminatively" refers to the external appearance mode as if the protruding wall portion 16 of the bowl portion 10 itself thus is radiating light spontaneously.

Therefore, particularly in the case where the placement location of the washing counter 1 is a location where a peaceful illumination environment is necessary such as an eating and drinking establishment such as a restaurant or bar, a more beautiful appearance can be obtained by the synergistic effect of the radiated light from the bowl portion 10 and the illumination light from other illumination appliances.

Although the height of the protruding wall portion 16 is 60 mm in this embodiment, it was confirmed in a separate test that it is possible for the surface of the protruding wall portion 16 having the same configuration to be caused to emit light with an illuminance uniform to the naked eye even in the case of 70 mm. That is, in this embodiment, as long as the protruding wall portion 16 is formed of the transparent member in which the light diffusing member 60 having the light refractive index different from that of the transparent base member 62 is dispersed and the light enters from the butt portion, the effect of the protruding wall portion 16 being caused to emit light self-illuminatively can be obtained without particular limitations on the height of the protruding wall portion 16.

Further, in this embodiment, the surface of the bowl main body 19, that is, the bottom wall portion 12 and the side wall portion 14, is used as a light diffusing face 64 that diffuses light by performing a surface texturing thereon. It is sufficient for the light diffusing face 64 to be a rough surface including a micro unevenness having a light diffusability; and a sandblast surface, for example, also can provide equivalent effects.

Thus, by using the surface of the bottom wall portion 12 and the side wall portion 14 as the light diffusing face 64, the light from outside the bowl main body 19 undergoes a diffused reflection at the surface of the bowl main body 19. Therefore, scratches and dirt on the surface of the bowl main body 19 are not easily noticeable; and the designability can be increased further.

Further, in such a configuration, the light from the interior of the protruding wall portion 16 of the bowl main body 19 diffused by the light diffusing member 60 is further diffused by the light diffusing face 64 when being radiated to the outside. Therefore, the effect also occurs that the protruding wall portion 16 forms a light radiation portion that radiates more uniform light. That is, the protruding wall portion 16 can emit light more self-illuminatively due to the synergistic effect between the light diffusing member 60 and the light diffusing face 64.

Herein, although a polymethacrylic acid ester particle is used as one example of the light diffusing member 60 because an epoxy resin is used as the transparent base member 62 in this embodiment, this is not limited thereto. In other words, although it is necessary for the light diffusing member 60 to be a transparent raw material having a refractive index different from the refractive index of the transparent base member 62 forming the bowl main body 19, it is possible to select appropriate material qualities matching the form of the light radiation portion and the material quality of the transparent base member 62 in a range that satisfies such conditions.

Moreover, although the particle size of the light diffusing member 60 is not limited, it is favorable for the average particle size to be in the range of 5 to 15 µm from the viewpoint of increasing the light diffusability. Accordingly, a substantially spherical polymethacrylic acid ester particle having an average particle size of 8 µm is used in this embodiment.

Further, from a similar viewpoint, it is favorable for the weight ratio of the light diffusing member 60 to the transparent base member 62 to be in the range of 0.1% to 0.5%.

Although an internal light diffusability which is a so-called diffusion function of the light in the raw material interior is manifested by arranging substantially spherical fine particles as the light diffusing member 60 and providing a refractive index difference with the transparent base member in the embodiment recited above, it is possible to appropriately select the configuration of the light diffusing member 60 as long as the transparent raw materials are such that it is possible to provide the refractive index difference with the transparent base member 62.

Further, although one type of fine particle is used as the light diffusing member 60 in the embodiment recited above, multiple types of light diffusing fine particles may be used.

That is, in this embodiment, as long as the protruding wall portion 16 is formed of a transparent member in which the light diffusing member 60 having a light refractive index different from that of the transparent base member 62 is dispersed and light enters from the butt portion thereof, the effect of the protruding wall portion 16 being caused to self-illuminatively emit light can be obtained without the material, the particle size, the weight ratio to the transparent base member 62, the configuration, the number of types, etc., of the light diffusing member 60 being limited to the illustrations described above.

Second Embodiment

A second embodiment of the washing counter of the invention will now be described using FIG. 5. The configuration of the washing counter 2 according to the second embodiment differs from that of the washing counter 1 according to the first embodiment recited above in that a bowl main body 79 is formed of a member having a single body instead of providing the light-shielding lid body 50. Otherwise, the configuration is similar to that of the washing counter 1 according to the first embodiment, and a description is therefore omitted.

Figure 5:
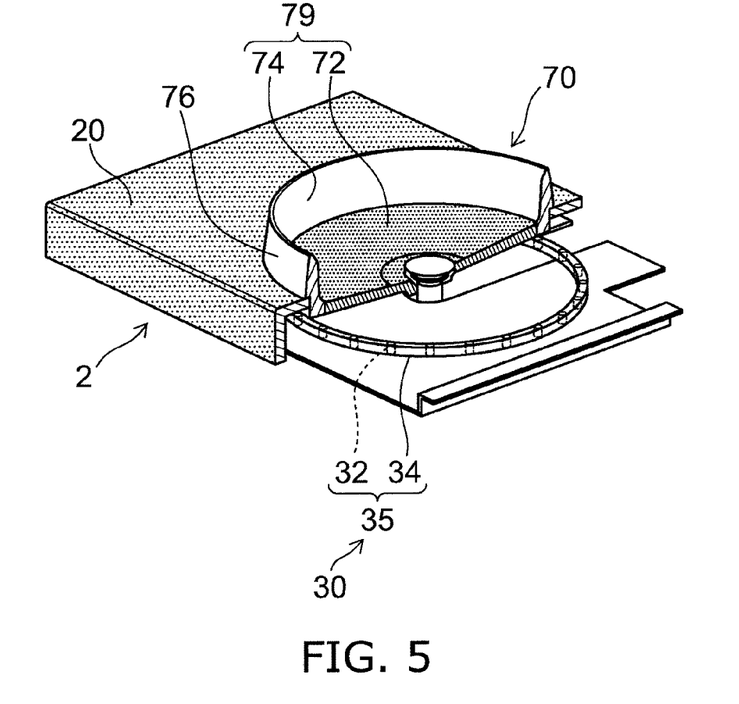
FIG. 5 is a perspective view in which a portion of a washing counter according to a second embodiment of the invention is cut away.

FIG. 5 is a perspective view in which a portion of the washing counter 2 according to the second embodiment of the invention is cut away. Similar portions or portions having similar functions as those of the first embodiment are marked with like reference numerals.

In the washing counter 2 according to this embodiment as illustrated in FIG. 5, a bowl portion 70 includes the bowl main body 79 in which a bottom wall portion 72 formed of light-shielding raw material is formed as a single body with a side wall portion 74 formed of a transparent member having the same composition as that of the bowl main body 19 of the first embodiment. The bowl main body 79 fits into a placement hole of the counter portion 20; and a protruding wall portion 76 of the side wall portion 74 protrudes upward from the counter portion 20.

Thus, due to the configuration of the bowl portion 70, the light from the light source portion 30 is blocked by the bottom wall portion 72 formed of a light-shielding raw material and is not radiated upward from the surface of the bottom wall portion 72. The light entering the interior of the side wall portion 74 from the butt portion of the transparent member which is the lower end of the side wall portion 74 of the bowl portion 70 propagates through the transparent base member 62 and is diffused by the light diffusing member 60 when reaching the light diffusing member 60. The light diffused by the light diffusing member 60 is radiated to the outside from the surface of the side wall portion 74. Thus, of the surface of the bowl portion 70 in this embodiment, the surface of the side wall portion 74 is used as the light radiation portion that radiates the light to the surroundings.

Thereby, in addition to providing effects similar to those of the first embodiment, the number of parts can be reduced and the manufacturing efficiency can be increased because the light can be radiated only from the surface of the side wall portion 74 of the bowl portion 70 without separately providing a light-shielding member and the like.

Although the light-shielding function is provided to a portion of the bowl portion in this embodiment by forming the bottom wall portion 72 of the bowl portion 70 from a light-shielding raw material, the form of providing the light-shielding function is not limited thereto; and a light-shielding resin layer may be formed by coating a light-shielding coating liquid onto the bottom wall portion upper face of the bowl portion.

Third Embodiment

A third embodiment of the washing counter of the invention will now be described using FIG. 6. The placement mode of the light source portion 30 in the washing counter 3 according to the third embodiment is different from that of the washing counter 1 according to the first embodiment recited above. Otherwise, the configuration is similar to that of the washing counter 1 according to the first embodiment, and a description is therefore omitted.

Figure 6:
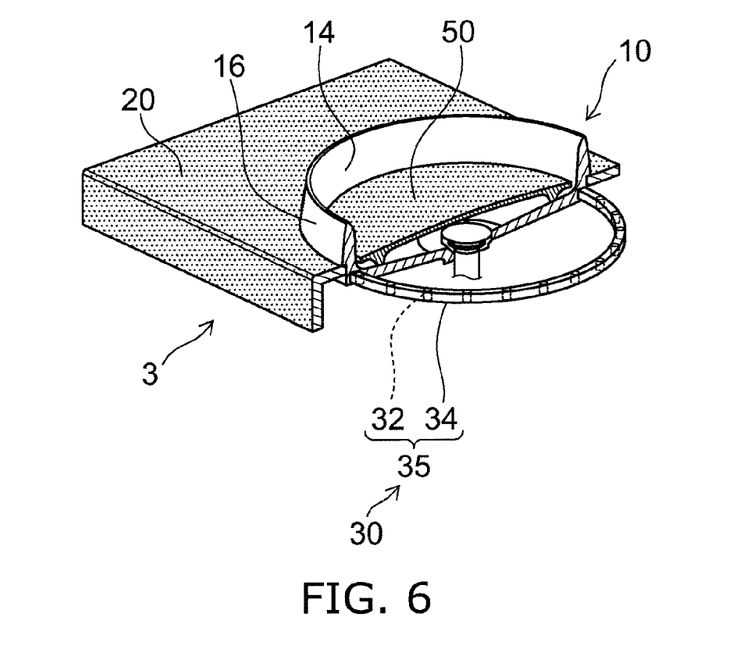
FIG. 6 is a perspective view in which a portion of a washing counter according to a third embodiment of the invention is cut away.

FIG. 6 is a perspective view in which a portion of the washing counter 3 according to the third embodiment of the invention is cut away. Similar portions or portions having the same functions as those of the first embodiment are marked with like reference numerals.

In the washing counter 3 according to this embodiment as illustrated in FIG. 6, the light source portion 30 is buried in the lower portion of the side wall portion 14 of the bowl main body 19. In other words, the light source portion 30 is buried beforehand in the lower portion of the side wall portion 14 of the bowl main body 19 when molding the bowl main body 19.

In such a configuration, in addition to providing effects similar to those of the first embodiment, implements (the fixation plate 36 of the first embodiment, etc.) for fixing the light source portion 30 are unnecessary and the number of parts can be reduced. Therefore, the installability can be improved because the work of fixing the light source portion 30 at the installation site can be omitted.

Fourth Embodiment

A fourth embodiment of the washing counter of the invention will now be described using FIG. 7 to FIG. 10.

Figure 7:
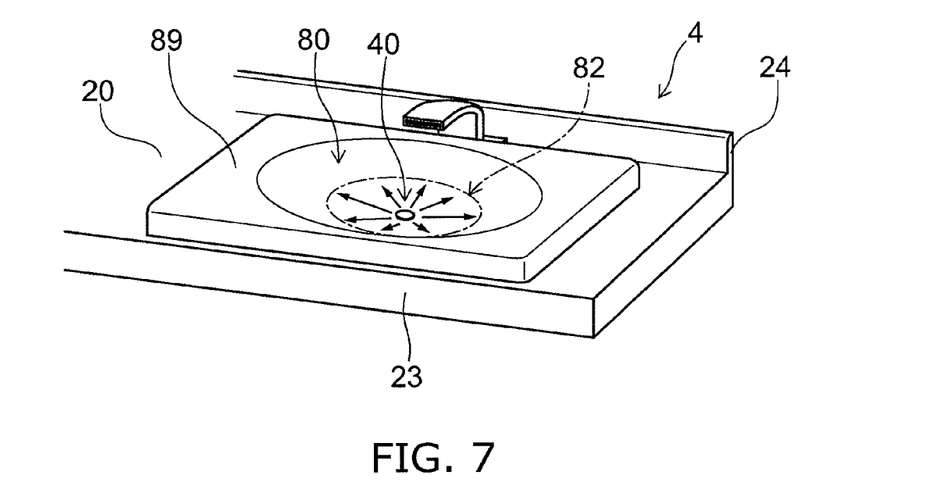
FIG. 7 is a perspective view illustrating the general view of a washing counter according to a fourth embodiment of the invention.

As illustrated in FIG. 7, the washing counter 4 includes the counter portion 20 and a bowl portion 80 having a smooth concave bowl-like configuration placed on the upper face of the counter portion 20. The bowl portion 80 includes a bowl main body 89 formed entirely of a transparent raw material and having an opening portion in the central bottom portion and includes a drainage metal fitting 40 provided in the opening portion to discharge the water from inside the bowl portion 80 to outside the washing counter 4.

The bowl main body 89 of this embodiment is formed of a transparent member having the same composition as that of the bowl main body 19 of the first embodiment recited above; and the proximity of the drainage metal fitting 40 is used as the light radiation portion 82 which is a region that radiates the light from the light emission source provided on the backside as illustrated in FIG. 7 to the inner face side of the bowl portion 80.

In other words, the transparent member forming the entire bowl main body 89 includes a base member of epoxy resin, which is an example of a transparent raw material, and dispersed micro particles of polymethacrylic acid ester, which is a transparent raw material having a light refractive index moderately different from that of the base member. The effects of providing moderate light dispersibility and light transmission characteristics with respect to the light entering the interior of the transparent member are the same as those described in the first embodiment.

Figure 8:
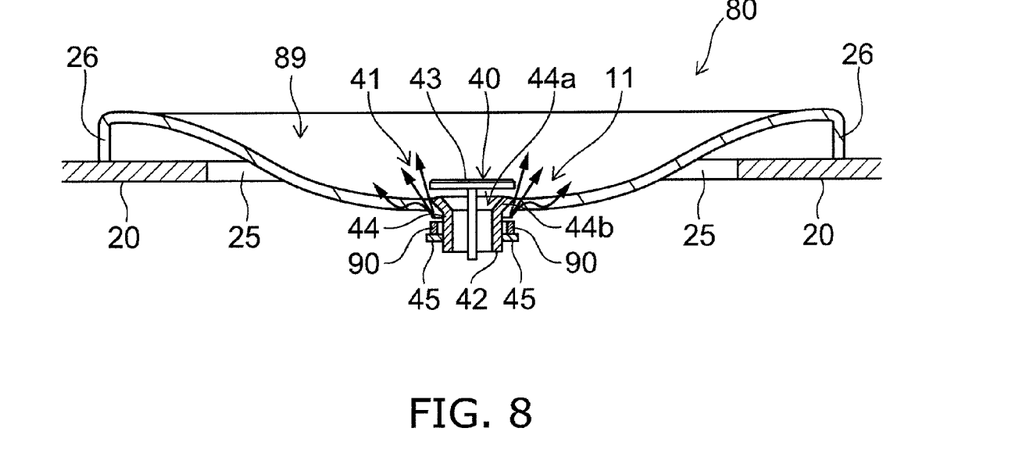
FIG. 8 is a descriptive view illustrating the whole configuration from a cross-sectional view of the washing counter according to the fourth embodiment of the invention.

As illustrated in FIG. 8, the bowl main body 89 is placed on the counter portion 20 upper face on a leg plate 26 hung in the outer edge portion in the state in which a concave bottom portion 11 is inserted into a placement hole 25 piercing the center of the counter portion 20. A drainage port (a drainage port portion) 41 is made in the central lowermost portion of the concave bottom portion 11 for mounting the drainage metal fitting 40.

The drainage metal fitting 40 includes a drainage port metal fitting 44 fit into the drainage port 41. The drainage port metal fitting 44 is formed in a cylindrical configuration and includes an upper end opening portion 44a and a brim portion 44b provided in the upper end portion of the upper end opening portion 44a. A drainage port lid 43 is attached at the upper end opening portion 44a of the drainage port metal fitting 44.

Figure 9:
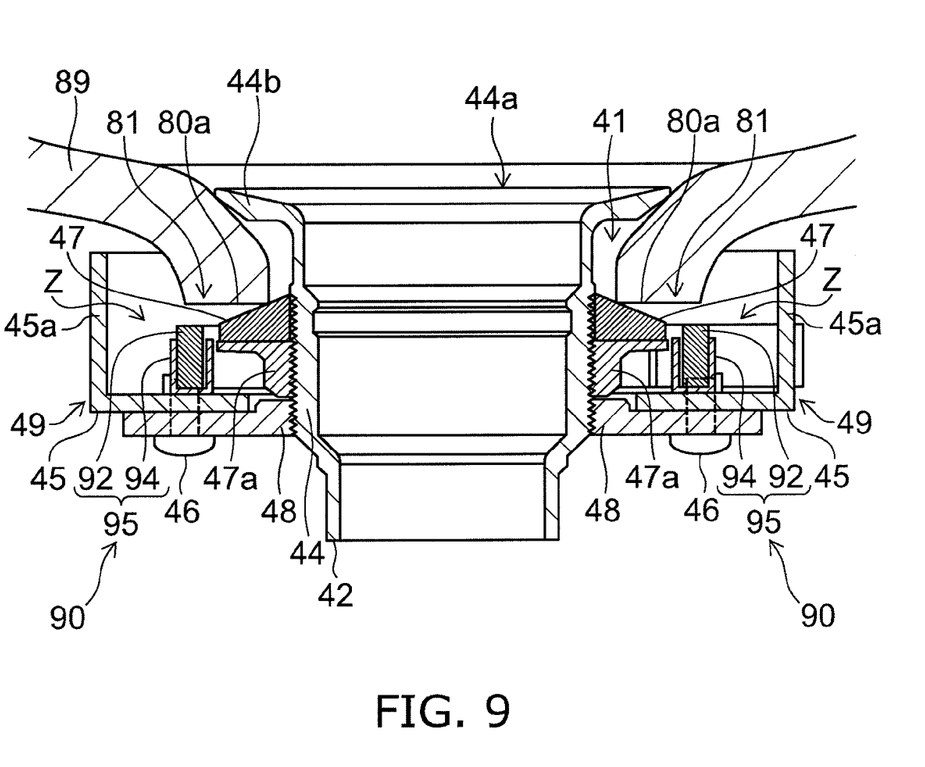
FIG. 9 is a descriptive view of a light source portion from a cross-sectional view of a drainage port proximity of the washing counter according to the fourth embodiment of the invention.

On the back face of the concave bottom portion 11, a light source portion 90 that emits light toward the bowl portion 80 is disposed by being mounted to the drainage port metal fitting 44 via a mounting holder 49 (referring to FIG. 9).

On the rear end portion of the counter portion 20, a standing portion 24 extending upward from the top face is provided. The standing portion 24 is connected to, for example, a wall face and the like and functions as a decorative plate and the like.

The configuration of the light radiation portion of the invention will now be described in detail using the drawings.

FIG. 9 is a detailed view of the perpendicular cross section of the drainage port 41 proximity of the concave bottom portion 11 of the bowl portion 80 and more specifically illustrates the configuration of the light source portion 90 such as the mount structure to the drainage port metal fitting 44.

As illustrated, the mounting holder 49 includes a mounting plate 48 fixed by being fastened with a screw to the outer circumferential face of the drainage port metal fitting 44 and a holder plate 45 forming a standing wall 45a in the outer circumferential portion. The mounting plate 48 and the holder plate 45 have a configuration of being fixed to each other by a mounting bolt 46. A watertight structure is provided by a water-sealing packing 47 being abutted to an annular end face 80a (the end face of the butt portion) of the bowl main body 89 by fastening an abutment metal fitting 47a including a fastening screw to an outer circumferential face of the drainage port metal fitting 44.

Further, as a light source, the light source portion 90 is an artificially arranged line-shaped light source in which many LED devices 92, which are point light sources, are arranged densely in a line configuration and the light radiation portion thereof have aligned light emission directions via a line-shaped band 94. That is, in this embodiment, an annular LED portion 95 linked in an annular configuration to match the end face configuration of the butt portion of the bowl main body 89 forming the bowl portion 80 is used as the light source portion 90. In this embodiment, a light radiation state uniform in the circumferential direction can be obtained at the butt portion proximity of the bowl main body 89 used as the light radiation portion 82 because the light source portion 90 is a line-shaped light source.

Each of the LED devices 92 used as the light source is disposed relative to the annular end face 80a (the end face of the butt portion) defining the drainage port 41 of the bowl main body 89.

Further, by placing the annular LED portion 95 on the holder plate 45 and disposing the annular LED portion 95 in an enclosed space Z defined by the outer circumferential wall of the drainage port metal fitting 44, the holder plate 45, and the standing wall 45a, considerations are taken as much as possible that the light from the light source portion 90 does not leak outside the enclosed space Z.

Herein, the "butt portion" used as the light incident portion 81 of the light radiation portion 82 of the invention generally refers to the section including the side face of a planar plate body or a curved plate body having a constant spread and is an end face portion formed in the thickness direction. Herein, in this embodiment as illustrated in FIG. 9, the annular end face 80a formed in the cylindrical configuration portion of the drainage port 41 forms an end face formed in the thickness direction of the cylindrical plate portion. Therefore, the annular end face 80a corresponds to the end face of the butt portion of the invention.

Figure 10A:
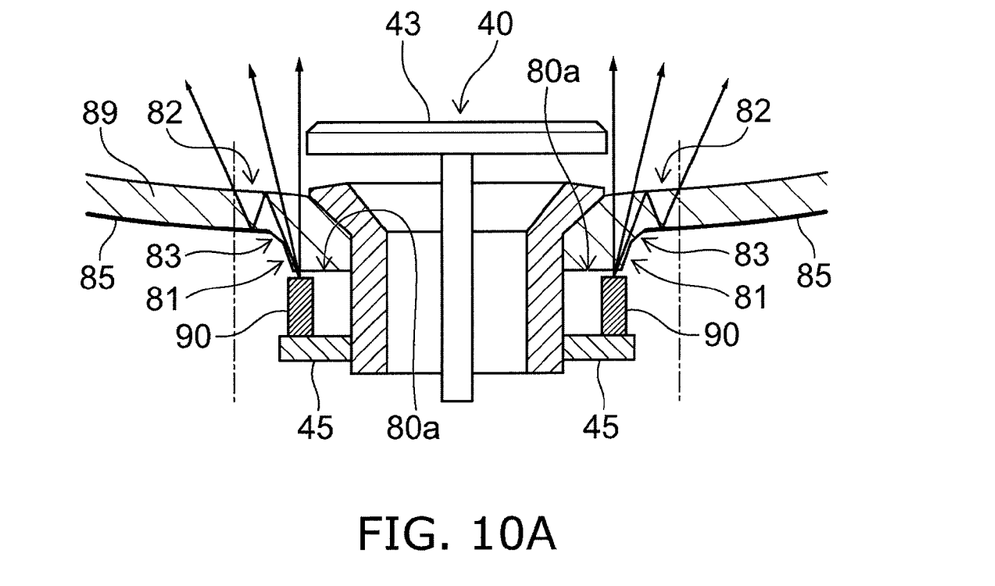
FIG. 10A and FIG. 10B are descriptive views from a cross-sectional view illustrating a radiation mode of light from the light source portion according to the fourth embodiment of the invention.
Figure 10B:
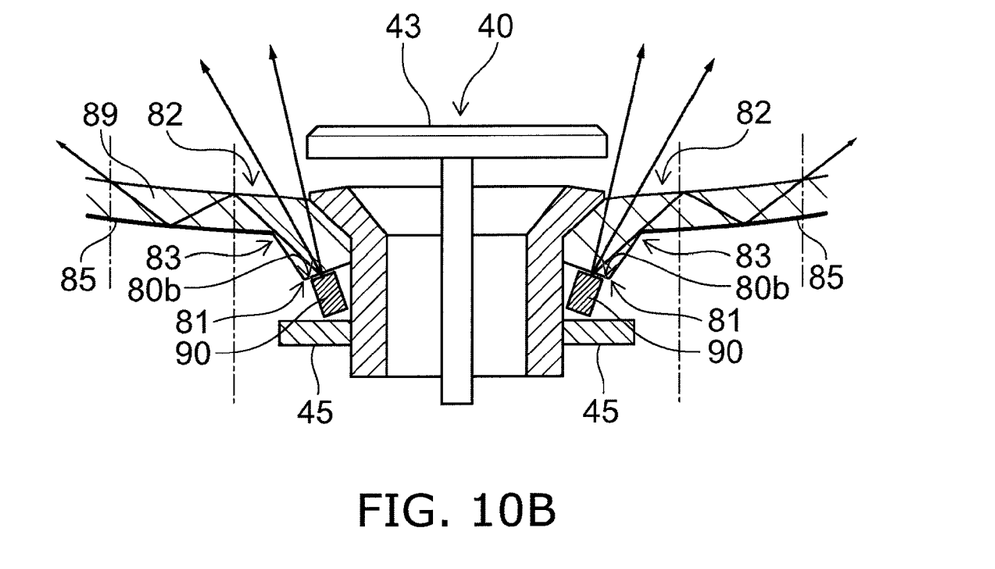

FIG. 10A and FIG. 10B schematically illustrate the relationship between the light source portion 90 and the light radiation portion 82 of this embodiment and a variation example thereof, respectively. In the case of a variation example such as that illustrated in FIG. 10B compared to this embodiment, an oblique face 80b corresponds to the end face of the butt portion used as the light incident portion 81 of the invention. In the case of a disposition in which the light emission direction of the light source portion 90 is tilted in the outer edge portion direction of the bowl main body 89 as in the variation example, not only is the light incident face widened and the light reception amount from the light source portion 90 increased but also the incident angle of the light on the bowl portion 80 can be set further in the outer circumferential portion direction. Therefore, effects can be obtained in which the range reached by the light from the light source widens and the range of the light radiation portion 82 also is wider than that of this embodiment as illustrated by the single dot-dash lines because the distance of the light guide portion 83 that transmits the light through the raw material while transmitting/refracting can be increased.

In this embodiment, because the entire bowl main body has light-transmitting characteristics, if left as-is, the structures on the backside are transmitted through the bowl portion 80 and can be visually confirmed by the user; and the appearance to the user worsens. Therefore, as illustrated in FIG. 10A and FIG. 10B, a light-shielding coating 85 is coated onto the outer bottom face of the bowl portion 80, i.e., the outer surface of the transparent member. As a result, the light guided in the light radiation portion 82 is prevented from being polarized to the bowl portion 80 outer surface side and being radiated outside the bowl portion 80.

Although the mounting holder 49 that fixes and supports the annular LED portion 95 used as the light source portion 90 is mounted and fixed to the drainage metal fitting 40 in this embodiment, a configuration may be used in which a mounting clamp is provided on the outer surface of the bowl main body 89 and the fixing is to the bowl main body 89.

Although various forms of favorable embodiments of the invention are described hereinabove, the invention is not limited to such designated embodiments; and various alterations/modifications are possible within the scope of the purport of the invention recited in the claims.

For example, although a configuration in which the light source is turned on continuously is supposed in the embodiments described above, this is not limited thereto; and a configuration may be used in which turning on/turning off is repeated.

Although a line-shaped light source in which many LEDs are arranged densely is used as the light source in the embodiments described above, cathode ray tubes and the like also may be employed as the line-shaped light source. Further, a form in which multiple point light sources are disposed facing the end face of the butt portion with spacing therebetween may be used as the line-shaped light source. In such a case, an external appearance can be obtained having bright and dark designability according to the disposed spacing.

Also, a detection sensor that detects a user approaching within a prescribed distance from the bowl portion and a controller connected to the detection sensor to control the light emission of the light source may be provided; and the controller may turn on the light source based on the detection signal thereof when the detection sensor detects the user.

Further, although the side wall face and the bottom face central portion of the bowl portion are formed as the light radiation portion of the invention in the embodiments described above, other portions of the bowl may be used as the light radiation portion based on the bowl portion configuration of the washing counter because the invention is applicable as long as the butt portion used as the incident portion of the light is provided at a position corresponding to the light radiation portion.

Moreover, although the example of epoxy resin is described as one example of the transparent base member of the transparent member forming the light radiation portion in the embodiments described above, it is sufficient for the transparent base member of the invention to be a transparent raw material; and as another example, acrylic resin can be applied. In such a case, it is possible to obtain effects equivalent to those of the invention by appropriately selecting a fine particle of a transparent raw material having a refractive index different from that of the acrylic resin as the light diffusing member.

Furthermore, polyester resin and vinyl ester resin can be applied as other examples of the transparent base member of the invention. In such cases as well, it is possible to obtain effects equivalent to those of the invention by appropriately selecting a fine particle of a transparent raw material having a refractive index different from that of the resin as the light diffusing member.

INDUSTRIAL APPLICABILITY

According to the invention, a washing counter can be provided with improved overall external appearance quality affected by the transparency of the raw materials used including the light emission quality in a washing makeup stand having a light emission source using a transparent raw material due to the appropriate configuration of the transparent raw material and the light emission source.

EXPLANATION OF REFERENCE 1 washing counter
2 washing counter
3 washing counter
4 washing counter
10 bowl portion
11 concave bottom portion
12 bottom wall portion
14 side wall portion
16 protruding wall portion
18 rim-like portion
19 bowl main body
20 counter portion
22 opening
23 apron portion
24 standing portion
25 placement hole
26 leg plate
30 light source portion
32 LED device
34 line-shaped band
35 annular LED portion
36 fixation plate
36a cutaway portion
40 drainage metal fitting
41 drainage port
42 drainage pipe
43 drainage port lid
44 drainage port metal fitting
44a upper end opening portion
44b brim portion
45 holder plate
45a standing wall
46 mounting bolt
47 water-sealing packing
47a abutment metal fitting
48 mounting plate
49 mounting holder
50 light-shielding lid body
52 leg portion
60 light diffusing member
62 base member
64 light diffusing face
70 bowl portion
72 bottom wall portion
74 side wall portion
76 protruding wall portion
79 bowl main body 80 bowl portion
80a annular end face (end face of butt portion)
80b oblique face (end face of butt portion)
81 light incident portion
82 light radiation portion
83 light guide portion
85 light-shielding coating (back coating)
89 bowl main body
90 light source portion
92 LED device
94 line-shaped band
95 annular LED portion
P light
Q light
S space
Z enclosed space

The invention claimed is:

1. A washing counter, comprising:
a bowl portion having a concave configuration used for washing and the like;
a counter portion supporting the bowl portion; and
a light source portion disposed on a backside of the bowl portion to emit light toward the bowl portion,
the washing counter radiating the light from the light source portion to surroundings from a surface of the bowl portion,
at least one portion of the bowl portion being formed of a transparent member obtained by dispersing a light diffusing member in a base member having a transparent raw material having a light-transmitting transparency, the light diffusing member being a micro particle having a transparent raw material having a light refractive index different from a light refractive index of the base member,
the light source portion being disposed to face an end face of a butt portion of the transparent member,
at least one portion of the transparent member being a light radiation portion, the light from the light source portion guided through the transparent member from the butt portion being radiated outside by the light radiation portion while being diffused by the light diffusing member due to the at least one portion of the bowl portion being formed of the transparent member and the light source portion being disposed to face the end face,
the bowl portion including:
a bowl main body member formed entirely of the transparent member and having a side wall portion having a protruding wall portion protruding upward from a top face of the counter portion; and
a light-shielding member formed of a light-shielding raw material shielding a transmission of light and disposed to cover an inner face of the bowl portion at substantially the same height as the top face of the counter portion; and
the butt portion being a lower end portion of the side wall portion, and the light radiation portion being a surface of the protruding wall portion.

2. A washing counter, comprising:
a bowl portion having a concave configuration used for washing and the like;
a counter portion supporting the bowl portion; and
a light source portion disposed on a backside of the bowl portion to emit light toward the bowl portion,
the washing counter radiating the light from the light source portion to surroundings from a surface of the bowl portion,
at least one portion of the bowl portion being formed of a transparent member obtained by dispersing a light diffusing member in a base member having a transparent raw material having a light-transmitting transparency, the light diffusing member being a micro particle having a transparent raw material having a light refractive index different from a light refractive index of the base member,
the light source portion being disposed to face an end face of a butt portion of the transparent member,
at least one portion of the transparent member being a light radiation portion, the light from the light source portion guided through the transparent member from the butt portion being radiated outside by the light radiation portion while being diffused by the light diffusing member due to the at least one portion of the bowl portion being formed of the transparent member and the light source portion being disposed to face the end face,
the bowl portion being formed as a single body of
a bottom wall portion formed of a light-shielding raw material and
a side wall portion formed of the transparent member,
the butt portion being a lower end portion of the side wall portion, and
the light radiation portion being a surface of the side wall portion.

3. The washing counter according to claim 1, wherein a surface of the bowl portion is a light scattering face made of a rough surface having a micro unevenness.

4. The washing counter according to claim 1, wherein the light source portion is a line-shaped light source made of a plurality of LED devices arranged according to a configuration of the bowl portion.

5. The washing counter according to claim 2, wherein a surface of the bowl portion is a light scattering face made of a rough surface having a micro unevenness.

6. The washing counter according to claim 2, wherein the light source portion is a line-shaped light source made of a plurality of LED devices arranged according to a configuration of the bowl portion.

* * * * *

UNITED STATES PATENT AND TRADEMARK OFFICE
CERTIFICATE OF CORRECTION

PATENT NO. : 8,337,033 B2
APPLICATION NO. : 12/992917
DATED : December 25, 2012
INVENTOR(S) : Takeshi Kaneda et al.

It is certified that error appears in the above-identified patent and that said Letters Patent is hereby corrected as shown below:

In the Specifications:

In column 11, line 36, please add -- 62 -- after the word "member".

In column 15, line 6, please add -- 89 -- after the word "body".

Signed and Sealed this
Twenty-first Day of May, 2013

Teresa Stanek Rea
*Acting Director of the United States Patent and Trademark Office*